United States Patent
Lindner et al.

(10) Patent No.: US 9,996,933 B2
(45) Date of Patent: Jun. 12, 2018

(54) METHODS AND APPARATUS FOR OUTLIER DETECTION AND CORRECTION OF STRUCTURED LIGHT DEPTH MAPS

(71) Applicant: QUALCOMM Incorporated, San Diego, CA (US)

(72) Inventors: Albrecht Johannes Lindner, La Jolla, CA (US); Kalin Atanassov, San Diego, CA (US); Stephen Verrall, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 15/069,751

(22) Filed: Mar. 14, 2016

(65) Prior Publication Data
US 2017/0178332 A1 Jun. 22, 2017

Related U.S. Application Data

(60) Provisional application No. 62/387,377, filed on Dec. 22, 2015.

(51) Int. Cl.
| | |
|---|---|
| *G06K 9/00* | (2006.01) |
| *G06T 7/00* | (2017.01) |
| *G06T 5/00* | (2006.01) |
| *G06K 9/03* | (2006.01) |
| *G06K 9/38* | (2006.01) |

(Continued)

(52) U.S. Cl.
CPC .............. *G06T 7/0057* (2013.01); *G06K 9/03* (2013.01); *G06K 9/38* (2013.01); *G06T 5/001* (2013.01);

(Continued)

(58) Field of Classification Search
CPC ... G06K 9/03; G06K 9/38; G06K 9/40; G01B 11/22; G06T 5/00; G06T 5/001;
(Continued)

(56) References Cited

U.S. PATENT DOCUMENTS

| | | | |
|---|---|---|---|
| 8,711,206 B2 | 4/2014 | Newcombe et al. | |
| 8,873,835 B2 * | 10/2014 | Asente | G06K 9/46 382/154 |

(Continued)

FOREIGN PATENT DOCUMENTS

| | | |
|---|---|---|
| CN | 103400366 A | 11/2013 |
| EP | 2860695 A1 | 4/2015 |

OTHER PUBLICATIONS

Gerig G., "Structured Light II", Apr. 2013 (Apr. 2013), XP055345756, pp. 1-69. Retrieved from the Internet: URL:http://www.sci.utah.edu/-gerig/CS6320-S2013/Materials/CS6320-CV-S2013-StructuredLight-II.pdf.

(Continued)

*Primary Examiner* — Eric Rush

(74) *Attorney, Agent, or Firm* — Knobbe, Martens, Olson & Bear, LLP

(57) ABSTRACT

Systems and methods for correcting errors in a depth map generated by a structured light system are disclosed. In one aspect, a method includes dividing a depth map into segments and calculating a density distribution of the depth values for each segment. The method includes detecting error (or "outlier") values by determining the depth values that fall outside of a range of depth values, the range of depth values representative of the highest density depth values for a given segment. The method includes detecting error values in the depth map as a whole based on the density distribution values for each segment.

39 Claims, 9 Drawing Sheets

(51) Int. Cl.
    *G06T 7/50*           (2017.01)
    *G06T 5/40*           (2006.01)

(52) U.S. Cl.
    CPC .............. *G06T 5/008* (2013.01); *G06T 5/009* (2013.01); *G06T 5/40* (2013.01); *G06T 7/50* (2017.01); *G06T 2207/10028* (2013.01); *G06T 2207/20004* (2013.01); *G06T 2207/20182* (2013.01)

(58) Field of Classification Search
    CPC ......... G06T 5/007; G06T 5/008; G06T 5/009; G06T 5/40; G06T 7/50; G06T 7/521; G06T 2207/10028; G06T 2207/20004; G06T 2207/20008; G06T 2207/20012; G06T 2207/20021; G06T 2207/20182
    USPC .............. 382/106, 154, 168, 171, 172, 254, 382/270–272, 275
    See application file for complete search history.

(56) References Cited

U.S. PATENT DOCUMENTS

| | | | | |
|---|---|---|---|---|
| 8,970,672 | B2* | 3/2015 | Goma | ................ H04N 13/0003 348/46 |
| 9,105,133 | B2* | 8/2015 | Baik | .................... G06T 7/50 |
| 2011/0032341 | A1* | 2/2011 | Ignatov | .............. H04N 13/0033 348/51 |
| 2012/0056874 | A1* | 3/2012 | Kim | ..................... G06T 7/50 345/419 |
| 2013/0136338 | A1 | 5/2013 | Asente et al. | |
| 2013/0314696 | A1 | 11/2013 | Atanassov et al. | |
| 2014/0340486 | A1* | 11/2014 | Asano | ..................... G06T 7/97 348/47 |
| 2014/0368613 | A1 | 12/2014 | Krupka | |
| 2014/0380115 | A1 | 12/2014 | Bar-On | |
| 2015/0055828 | A1* | 2/2015 | Zhao | ................... G06K 9/00355 382/103 |
| 2016/0182893 | A1* | 6/2016 | Wan | ..................... G06T 7/593 348/50 |
| 2017/0084014 | A1* | 3/2017 | Moon | ................. G06K 9/00208 |
| 2017/0098310 | A1* | 4/2017 | Chefd'hotel | .............. G06T 7/12 |
| 2017/0127046 | A1* | 5/2017 | Das | ..................... G06T 5/40 |
| 2017/0127048 | A1* | 5/2017 | Nobayashi | ............ G06T 7/0002 |

OTHER PUBLICATIONS

International Search Report and Written Opinion—PCT/US2016/064119—ISA/EPO—dated Mar. 24, 2017.

* cited by examiner

METHODS AND APPARATUS FOR OUTLIER DETECTION AND CORRECTION OF STRUCTURED LIGHT DEPTH MAPS

INCORPORATION BY REFERENCE TO ANY PRIORITY APPLICATION(S)

This application claims the benefit of U.S. Provisional Application No. 62/387,377, titled "METHODS AND APPARATUS FOR OUTLIER DETECTION AND CORRECTION OF STRUCTURED LIGHT DEPTH MAPS," filed on Dec. 22, 2015, the disclosure of which is incorporated by reference herein.

FIELD

This disclosure generally relates to systems and methods for detecting and correcting structured light depth map inconsistencies.

BACKGROUND

Structured light systems transmit and receive light patterns, or spatial codes, to generate a depth map. The farther away an object is from the transmitter and receiver, the closer the received projection is from its original position at the receiver(s), as the outgoing projection and incoming projection are more parallel. Conversely, the closer an object is to the transmitter and receiver, the farther the received projection is from its original position at the receiver(s). Thus, the difference between received and transmitted codeword position gives the depth of the scene or object. Structured light systems use these relative depths to generate a depth map or a three dimensional representation of a scene. Depth map extraction is critical to many applications ranging from camera quality enhancement to computer vision.

Reflective or transparent surfaces in the scene can present challenges. For example, reflections can cause light to be reflected either away from the receiver or right into its optics. In both cases, the dynamic range of the structured light system can be exceeded. Transparent or semi-transparent surfaces also cause difficulties, as well as double reflections and inter-reflections that can compromise proper detection of the transmitted codewords. Also, translucent materials, such as skin, marble, wax, plants and human tissue may cause sub-surface scattering. In this context, there is a need to detect and correct outlier values in a depth map to provide an accurate generation of a depth map.

SUMMARY

A summary of sample aspects of the disclosure follows. For convenience, one or more aspects of the disclosure may be referred to herein simply as "some aspects."

Methods and apparatuses or devices being disclosed herein each have several aspects, no single one of which is solely responsible for its desirable attributes. Without limiting the scope of this disclosure, for example, as expressed by the claims which follow, its more prominent features will now be discussed briefly.

In accordance with one aspect, there is provided an apparatus for correcting errors in a depth map. The apparatus may include a transmitter configured to project a plurality of codewords in a projected field-of-view. The apparatus may include a receiver configured to receive a reflection of the projected codewords from a surface in the projected field-of-view. The apparatus may include an error correction circuit configured to generate the depth map based on the received reflection of the projected codewords, divide the depth map into a plurality of segments, determine a lower quantile depth value and an upper quantile depth value in each of the segments, generate a global depth range based on (i) a minimum of lower quantile depth value of the segments and (ii) a maximum of upper quantile depth value of the segments, identify an outlier depth value in the depth map, and correct the outlier depth value based on information in the depth map.

For some embodiments, the upper quantile depth value and the lower quantile depth value are determined based on at least one of (i) a histogram quantile calculation and (ii) a mean and variance calculation, each of the calculations based on a range of depth values in each segment and a contiguous subset of the range of depth values, the contiguous subset representing a density of depth values in the segment. For some embodiments, the contiguous subset of the range depth values comprises the lower quantile depth value and the upper quantile depth value, the lower quantile depth value being the lowest depth value within the contiguous subset and the upper quantile being the highest depth value in the contiguous subset. For some embodiments, projecting the plurality of codewords includes propagating light through a codemask, the codemask having a plurality of symbols. For some embodiments, identifying the outlier depth value in the depth map comprises detecting a depth value in the depth map outside of the global depth range. For some embodiments, the plurality of segments comprise overlapping regions of the depth map.

For some embodiments, correcting the outlier depth value includes determining a plurality of depth values neighboring the outlier depth value, the plurality of depth values being within the global depth range, calculating a first depth value based on the plurality of depth values, and replacing the outlier depth value with the first depth value. For some embodiments, the first depth value is an average of the plurality of depth values. For some embodiments, correcting the outlier depth value includes determining a plurality of depth values neighboring the outlier depth value, the plurality of depth values being within the global depth range, calculating at least one of a horizontal gradient and a vertical gradient of the neighboring depth values, calculating a first depth value based on the at least one of the horizontal gradient and the vertical gradient, and replacing the outlier depth value with the first depth value. In some embodiments, the size of each segment in the plurality of segments is user configurable.

In accordance with another aspect, there is provided a method operable by a depth mapping system, of correcting errors in a depth map. The method may further include projecting, via a transmitter, a plurality of codewords in a projected field-of-view. The method may further include receiving, at a receiver, a reflection of the projected codewords from a surface in the projected field-of-view. The method may further include generating, via an error correction circuit, the depth map based on the received reflection of the projected codewords. The method may further include dividing, via the error correction circuit, the depth map into a plurality of segments. The method may further include determining, via the error correction circuit, a lower quantile depth value and an upper quantile depth value in each of the segments. The method may further include generating, via the error correction circuit, a global depth range based on (i) a minimum of lower quantile depth value of the segments and (ii) a maximum of upper quantile depth value of the segments. The method may further include identifying, via the error correction circuit, an outlier depth value in the depth map. The method may further include correcting, via the error correction circuit, the outlier depth value based on information in the depth map.

For some embodiments, the method may include determining the upper quantile depth value and the lower quantile depth value based on at least one of (i) a histogram quantile calculation and (ii) a mean and variance calculation, each of the calculations based on a range of depth values in each segment and a contiguous subset of the range of depth values, the contiguous subset representing a density of depth values in the segment. For some embodiments, the contiguous subset of the range depth values comprises the lower quantile depth value and the upper quantile depth value, the lower quantile depth value being the lowest depth value within the contiguous subset and the upper quantile being the highest depth value in the contiguous subset. For some embodiments, projecting the plurality of codewords comprises propagating light through a codemask, the codemask having a plurality of symbols. For some embodiments, identifying the outlier depth value in the depth map comprises detecting a depth value in the depth map outside of the global depth range. For some embodiments, the plurality of segments comprise overlapping regions of the depth map.

For some embodiments, correcting the outlier depth value includes determining a plurality of depth values neighboring the outlier depth value, the plurality of depth values being within the global depth range, calculating a first depth value based on the plurality of depth values, and replacing the outlier depth value with the first depth value. For some embodiments, the first depth value is an average of the plurality of depth values. For some embodiments, correcting the outlier depth value may include determining a plurality of depth values neighboring the outlier depth value, the plurality of depth values being within the global depth range, calculating at least one of a horizontal gradient and a vertical gradient of the neighboring depth values, calculating a first depth value based on the at least one of the horizontal gradient and the vertical gradient, and replacing the outlier depth value with the first depth value. In some embodiments, the size of each segment in the plurality of segments is user configurable.

In accordance with another aspect, there is provided an apparatus for correcting errors in a depth map. The apparatus may include means for projecting a plurality of codewords in a projected field-of-view. The apparatus may include means for receiving a reflection of the projected codewords from a surface in the projected field-of-view. The apparatus may include means for generating the depth map based on the received reflection of the projected codewords. The apparatus may include means for dividing the depth map into a plurality of segments. The apparatus may include means for determining a lower quantile depth value and an upper quantile depth value in each of the segments. The apparatus may include means for generating a global depth range based on (i) a minimum of lower quantile depth value of the segments and (ii) a maximum of upper quantile depth value of the segments. The apparatus may include means for identifying an outlier depth value in the depth map. The apparatus may include means for correcting the outlier depth value based on information in the depth map.

In accordance with another aspect, there is provided a non-transitory computer-readable medium comprising instructions that when executed by a device cause the device to project, via a transmitter, a plurality of codewords in a projected field-of-view. The device may also be caused to receive, at a receiver, a reflection of the projected codewords from a surface in the projected field-of-view. The device may also be caused to generate, via an error correction system, the depth map based on the received reflection of the projected codewords. The device may also be caused to divide, via the error correction system, the depth map into a plurality of segments. The device may also be caused to determine, via the error correction system, a lower quantile depth value and an upper quantile depth value in each of the segments. The device may also be caused to generate, via the error correction system, a global depth range based on (i) a minimum of lower quantile depth value of the segments and (ii) a maximum of upper quantile depth value of the segments. The device may also be caused to identify, via the error correction system, an outlier depth value in the depth map. The device may also be caused to correct, via the error correction system, the outlier depth value based on information in the depth map.

BRIEF DESCRIPTION OF THE DRAWINGS

Various features, nature and advantages may become apparent from the detailed description set forth below when taken in conjunction with the drawings in which like reference characters identify correspondingly throughout.

DETAILED DESCRIPTION

Figure 1:
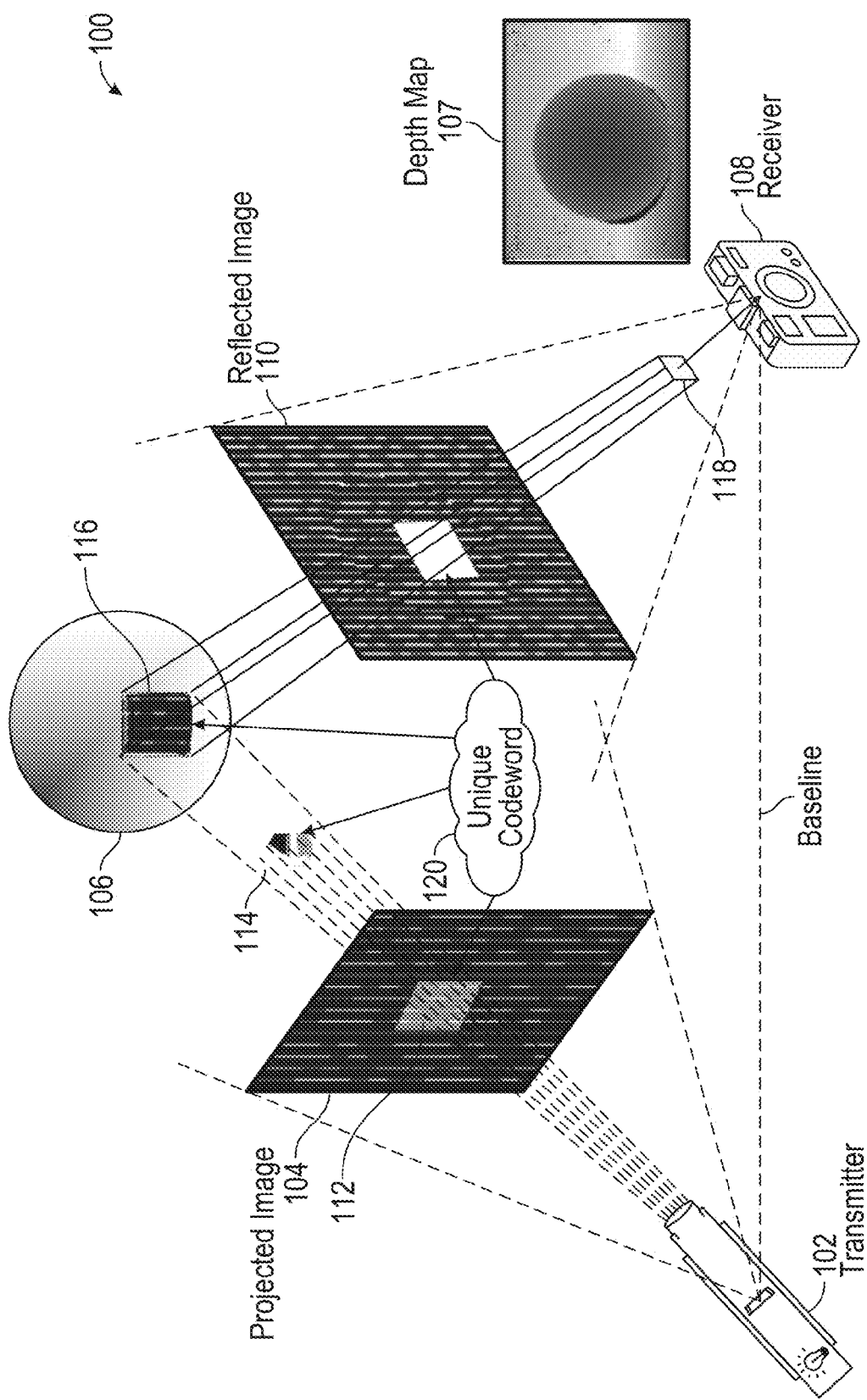
FIG. 1 illustrates an example of a sensing system where a known pattern is used to illuminate a scene and obtain depth information with which to generate 3-dimensional information.

The following detailed description is directed to certain specific embodiments of the invention. However, the invention can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

The systems and methods described herein may be implemented on a variety of different computing devices that hosts an active spatial sensing system. These include dedicated imaging systems, mobile phones, tablets, dedicated cameras, wearable computers, personal computers, photo booths or kiosks, personal digital assistants, ultra-mobile personal computers, and mobile internet devices. They may use general purpose or special purpose computing system environments or configurations. Examples of computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

In accordance with aspects of the present disclosure, structured light active sensing systems 100 transmit and receive spatial codes to generate a depth map. Spatial codes may be comprised of symbols, such as binary symbols. As the number of spatial codes increases, the number of symbols for each spatial code increases, the bandwidth per symbol increases, the space required to display each symbol increases, and the resolution of the depth mask decreases. As spatial code size increases spatially, the resolution of the depth mask decreases. Therefore, there is a need to reduce the number of unique spatial codes that are used by making it possible to repeat codes more frequently within each frame.

Transmitted rays of a projection of codes from a transmitter to an object are more parallel to received (incoming) codes reflected off of the surface of an object illuminated by the transmitted rays as the distance between the transmitter/receiver and the object increases. Accordingly, codes reflected from an object and received by a receiver, or receivers, are closer to their original position (in the projected code image) when the object is farther away. Conversely, the closer an object is to the transmitter and receiver, the farther the received codes are from the original position of the codes (in the projected code image) when they were transmitted. The difference between received and transmitted codeword positions can be used to determine one or more depths of a scene or an object. Structured light active sensing systems 100 may use such depth information to generate a depth map or a three dimensional representation of a scene. Depth map generation of a scene or an object may be important to many applications, including, for example, camera quality enhancement, computer vision, etc.

As discussed above, structured light systems project a known pattern (e.g., codewords) onto at least one object in a scene (sometimes referred to as being projected onto a scene for ease of description), and process the received image to obtain a depth map. Inevitably, due to speckle or other noise sources, certain regions of the received pattern are not decoded. These un-coded regions create holes in the depth map which contain no depth information thus degrading the utility of the map. Noise may also create regions of the decoded pattern that may not provide an accurate depth value, or that may provide an accidentally accurate depth value. Such regions create holes or interference in the depth map which contain no depth information or inaccurate depth information, thus degrading the utility of the map.

In some embodiments, the disclosed systems and methods may determine the most likely codeword (sometimes referred to as a "code" for ease of reference) that was transmitted by attempting to determine the most likely code that was transmitted, based on neighboring codes.

FIG. 1 illustrates an example of an active sensing system 100 where a known pattern is used to illuminate a scene and obtain depth information with which to generate 3-dimensional ("3D") information from 2-dimensional (2D") images and/or information. One or more aspects and/or features described herein may be implemented within such exemplary active sensing system 100. The system illustrated in FIG. 1 includes a transmitter 102 and a receiver 108. The transmitter 102 projects a light field through a codemask 410 to project an image 104 of codewords on an object or scene 106. Herein, for clarity of description, "scene" may be used to refer to either or both a scene and an object depending on the context used. For example, a scene may include a single object of interest, or a plurality of objects of interest. A receiver 108 captures the reflected image 110 and codewords therein. This example illustrates how a section 112 of the codemask 410 is projected (as section 114) onto the surface (e.g., projected section 116) of the scene 106. The projected section 116 may then be captured by the receiver 108 as a captured segment 118. The section 112 may be used as a codeword that can be uniquely identified 120. Thus, by covering the scene 106 with unique codewords in this manner, sections/portions of the scene 106 may be identified by reflected codewords and this information may be used for sensing the distance (depth) from the sensing device to objects in the scene.

From the image captured by the receiver 108, multiple segments may be identified over the scene 106. Each captured segment 118 may be uniquely identifiable at the receiver 108 and its location relative to other segments ascertained from the known pattern of the projected image 104. The identification of a code from each segment/portion/window may involve pattern segmentation (e.g., to address distortion) and decoding of the perceived segment/portion/window into a corresponding code(s). Additionally, triangulation may be applied over each captured segment/portion/window to ascertain an orientation and/or depth. Multiple such segments/portions/windows may be combined to stitch together a captured image pattern. In this manner, a depth map 107 may be generated for the scene 106.

Figure 2:
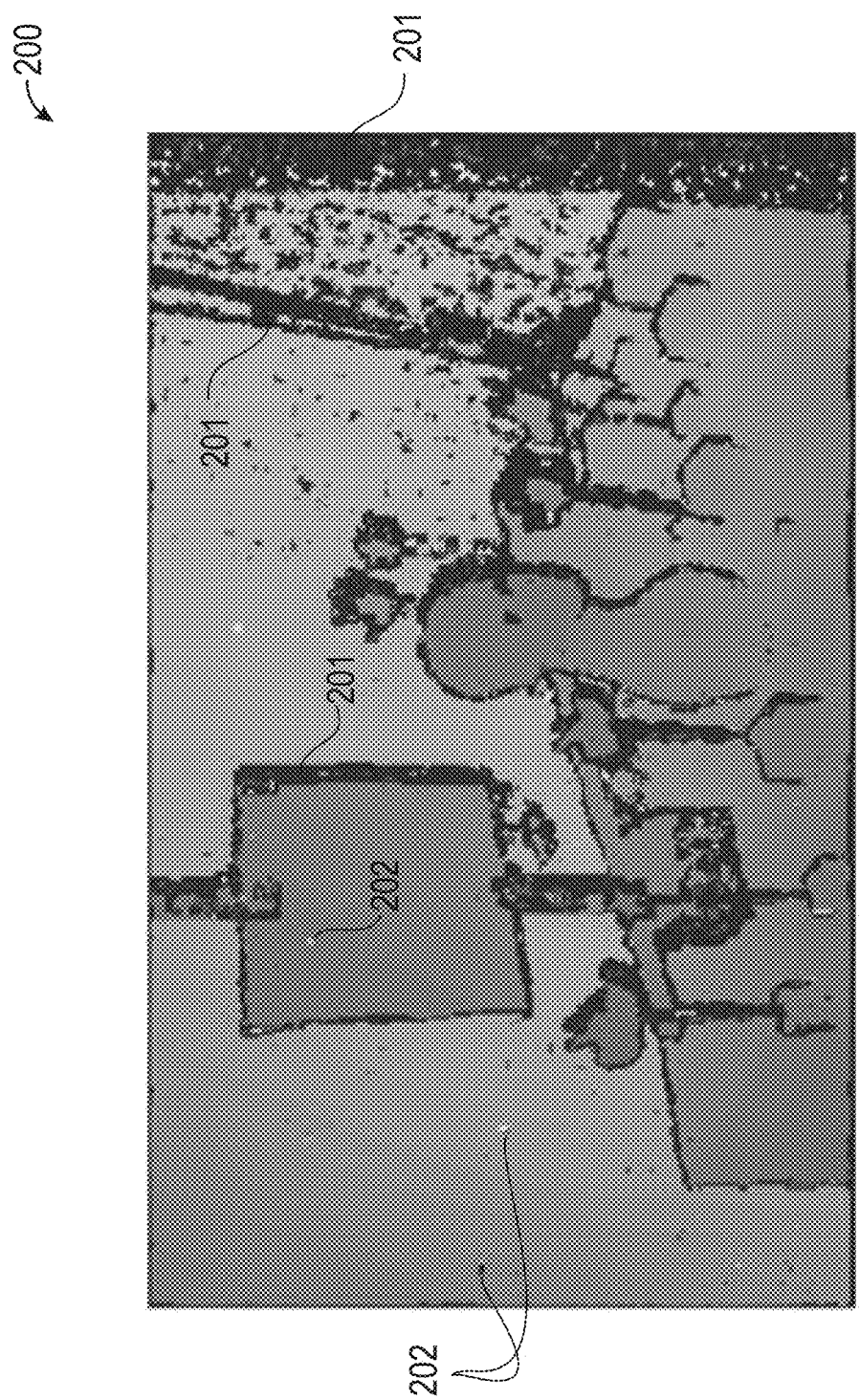
FIG. 2 illustrates an example depth map containing errors.

FIG. 2 illustrates an example depth map 200 that includes codewords that include invalid values 201 and codewords that include accidentally valid values 202. As stated above, noise can alter bits in detected codes which can result in codewords that include invalid values 201 and codewords that include accidentally valid values 202, thereby producing a visually unpleasant depth map and one that may be less useful.

Codes for Active Depth Sensing

Structured light patterns may be projected onto a scene by shining light through a codemask 410. Light projected through the codemask 410 may contain one or more tessellated codemask 410 primitives. Each codemask 410 primitive may contain an array of spatial codes. A codebook or data structure may include the set of codes. Spatial codes, the codemask 410, and codemask 410 primitives may be generated using basis functions. The periodicities of the basic functions may be chosen to meet the requirements for the aggregate pattern of Hermitian symmetry (for eliminating ghost images and simplifying manufacturing), minimum duty cycle (to ensure a minimum power per codeword), perfect window property (for optimum contour resolution and code packing for high resolution), and randomized shifting (for improved detection on object boundaries). A receiver may make use of the codebook and/or the attributes of the design intended to conform to the constraints when demodulating, decoding, and correcting errors in received patterns.

The size and corresponding resolution of the spatial codes corresponds to a physical spatial extent of a spatial code on a codemask 410. Size may correspond to the number of rows and columns in a matrix that represents each codeword. The smaller a codeword, the smaller an object that can be detected. For example, to detect and determine a depth difference between a button on a shirt and the shirt fabric, the codeword should be no larger than the size of the button. In an embodiment, each spatial code may occupy four rows and four columns. In an embodiment, the codes may occupy more or fewer rows and columns (rows×columns), to occupy, for example, 3×3, 4×4, 4×5, 5×5, 6×4, or 10×10 rows and columns.

The spatial representation of spatial codes corresponds to how each codeword element is patterned on the codemask 410 and then projected onto a scene. For example, each codeword element may be represented using one or more dots, one or more line segments, one or more grids, some other shape, or some combination thereof.

The "duty cycle" of spatial codes corresponds to a ratio of a number of asserted bits or portions (e.g., "1s") to a number of un-asserted bits or portions (e.g., "0s") in the codeword. When a coded light pattern including the codeword is projected onto a scene, each bit or portion that has a value of "1" may have energy (e.g., "light energy"), but each bit having a value of "0" may be devoid of energy. For a codeword to be easily detectable, the codeword should have sufficient energy. Low energy codewords may be more difficult to detect and may be more susceptible to noise. For example, a 4×4 codeword has a duty cycle of 50% or more if 8 or more of the bits in the codeword are "1." There may be minimum (or maximum) duty cycle constraints for individual codewords, or duty cycle constraints, for example, an average duty cycle for the set of codes in the codebook.

The "contour resolution" or "perfect window" characteristic of codes indicates that when a codeword is shifted by an amount, for example, a one-bit rotation, the resulting data represents another codeword. An amount that the codeword is shifted may be referred to as a shift amount. Codes with high contour resolution may enable the structured light depth sensing system to recognize relatively small object boundaries and provide recognition continuity for different objects. A shift amount of 1 in the row dimension and 2 in the column dimension may correspond to a shift by one bit positions to the right along the row dimension, and two bit positions down along the column dimension. High contour resolution sets of codewords make it possible to move a window on a received image one row or one column at a time, and determine the depth at each window position. This enables the determination of depth using a 5×5 window at a starting point centered at the third row and third column of a received image, and moving the 5×5 window to each row, column location from the third row to the third to last row, and the third column to the third to last column. As the codewords overlap, the window may be sized based on the resolution of the object depths to be determined (for example, a button on a shirt).

The symmetry of codes may indicate that the code mask or codebook primitive has Hermitian symmetry, which may provide several benefits as compared to using non-Hermitian symmetric codebook primitives or patterns. Patterns with Hermitian symmetries are "flipped" or symmetric, along both X and Y (row and column) axes.

The aliasing characteristic of codemasks or codemask 410 primitives corresponds to a distance between two codewords that are the same. When an optical pattern includes a tessellated codebook primitive, and when each codebook in the primitive is unique, the aliasing distance may be based on the size of the codebook primitive. The aliasing distance may thus represent a uniqueness criterion indicating that each codeword of the codebook primitive is to be different from each other codeword of the codebook primitive, and that the codebook primitive is unique as a whole. The aliasing distance may be known to one or more receiver devices, and used to prevent aliasing during codeword demodulation. The cardinality of a codemask 410 corresponds to a number of unique codes in a codebook primitive.

Transmitter Device

Figure 3:
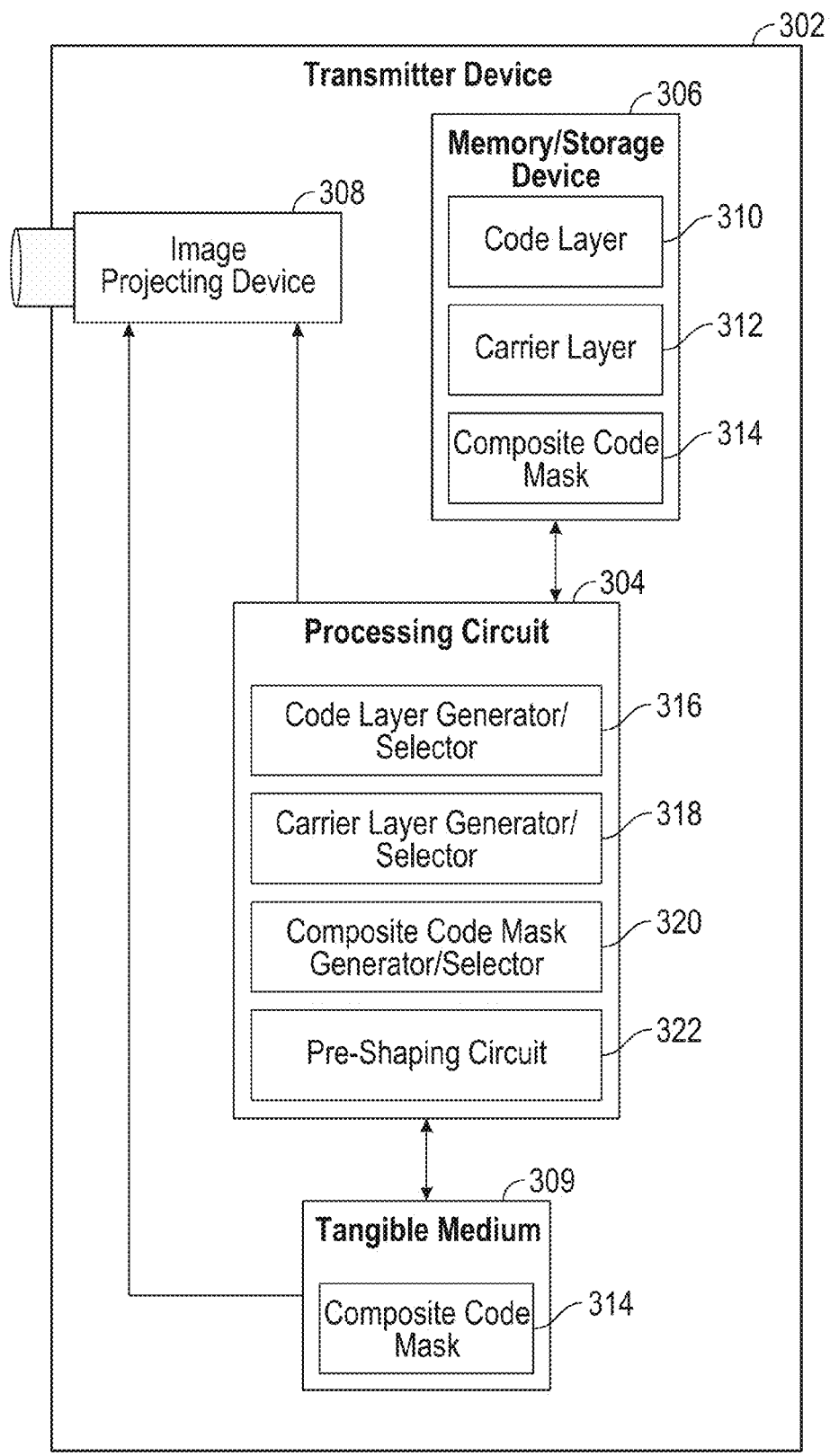
FIG. 3 illustrates a block diagram of an example transmitter device that may be configured to generate a composite code mask and/or project such code mask.

FIG. 3 is a block diagram illustrating an example of a transmitter device that may be configured to generate a composite code mask and/or project such composite code mask. The transmitter device 302 may include a processing circuit 304 (or processor) coupled to a memory/storage device 306, an image projecting device 308, and/or a tangible medium 309.

In a first example, the transmitter device 302 may be coupled to include a tangible medium 309. The tangible medium may define, include, and/or store a composite code mask 314. The composite code mask may include a code layer combined with a carrier layer. The code layer may include uniquely identifiable spatially-coded codewords defined by a plurality of symbols. The carrier layer may be independently ascertainable and distinct from the code layer and includes a plurality of reference objects that are robust to distortion upon projection. At least one of the code layer and carrier layer may be pre-shaped by a synthetic point spread function prior to projection.

In a second example, the processing circuit 304 may include a code layer generator/selector 316, a carrier layer generator/selector 318, a composite code mask generator/selector 320 and/or a pre-shaping circuit 322. The code layer generator/selector 316 may select a pre-stored code layer 310 and/or may generate such code layer. The carrier layer generator/selector 318 may select a pre-stored carrier layer 312 and/or may generate such carrier layer. The composite code mask generator/selector may select a pre-stored composite code mask 314 and/or may combine the code layer 310 and carrier layer 312 to generate the composite code mask 314. Optionally, the processing circuit 304 may include a pre-shaping circuit that pre-shapes the composite code mask 314, the code layer 310, and/or the carrier layer 312, to compensate for expected distortion in the channel through which the composite code mask is to be projected.

In some implementations, a plurality of different code layers and/or carrier layers may be available, where each such carrier or code layers may be configured for different conditions (e.g., for objects at different distances, or different configurations between the transmitter device and receiver device). For instance, for objects within a first distance or range, a different combination of code and carrier layers may be used than for objects at a second distance or range, where the second distance is greater than the first distance. In another example, different combination of code and carrier layers may be used depending on the relative orientation of the transmitter device and receiver device.

The image projecting device 308 may serve to project the generated/selected composite code mask onto an object of interest. For instance, a laser or other light source may be used to project the composite code mask onto the object of interest (e.g., through a projection channel). In one example, the composite code mask 314 may be projected in an infrared spectrum, so it may not be visible to the naked eye. Instead, a receiver sensor in the infrared spectrum range may be used to capture such projected composite code mask.

Receiver Device Operation

Figure 4:
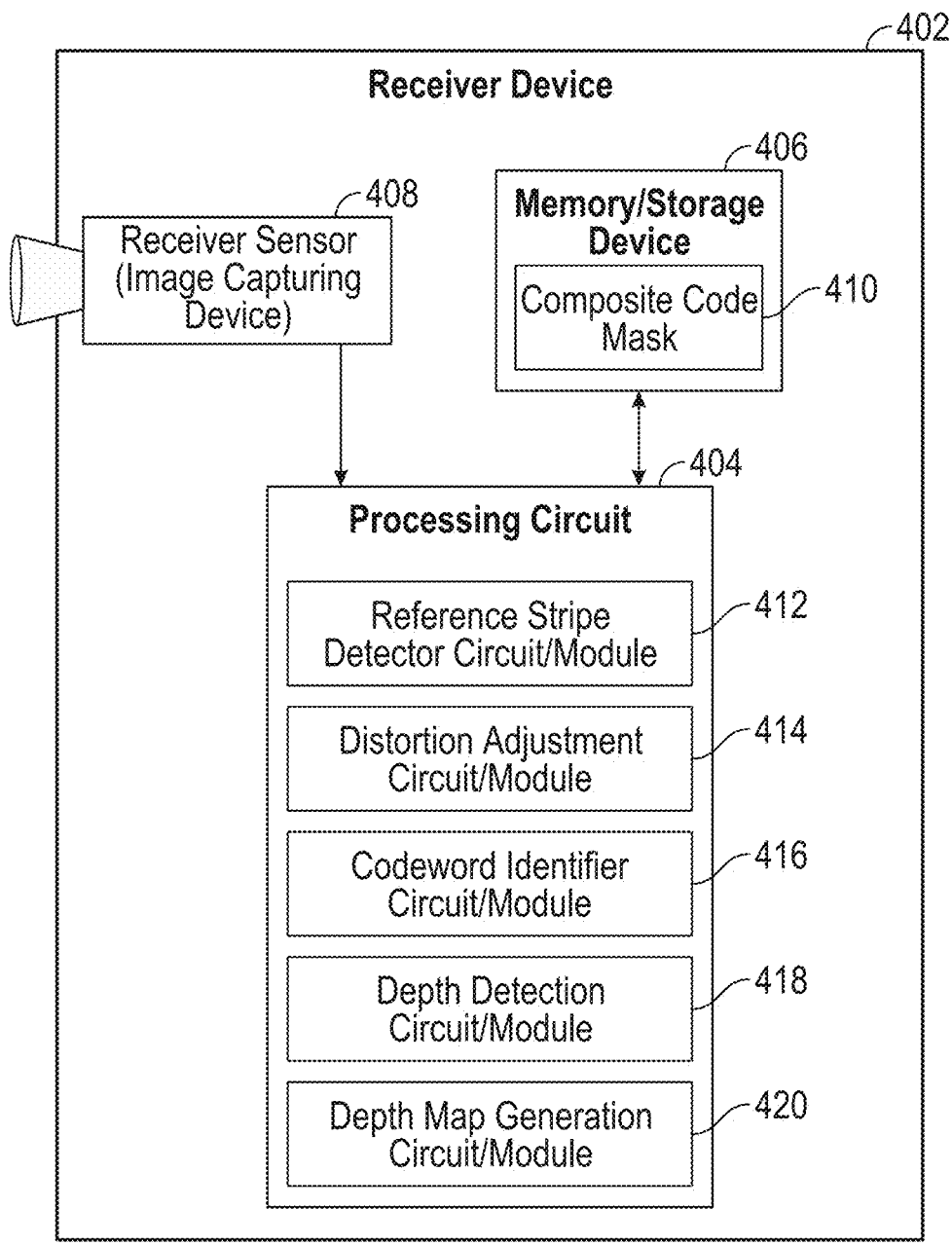
FIG. 4 illustrates a block diagram of an example receiver device that may be configured to obtain depth information from a composite code mask.

FIG. 4 is a block diagram illustrating an example of a receiver device 402 that is configured to receive a composite code mask reflected from an object and to determine be depth information from a composite code mask. The receiver device 402 may include a processing circuit 404 coupled to a memory/storage device 406 and a receiver sensor 408 (e.g., an image capturing device). In some embodiments, the receiver sensor 408 is an image capture device, for example, a camera.

The receiver sensor 408 may be configured to obtain at least a portion of a composite code mask projected on the surface of an object. For instance, the receiver sensor may capture an image of at least a portion of a composite code mask projected on the surface of a target object. The composite code mask may be defined by: (a) a code layer of uniquely identifiable spatially-coded codewords defined by a plurality of symbols, and (b) a carrier layer independently ascertainable and distinct from the code layer and including a plurality of reference objects that are robust to distortion upon projection. At least one of the code layer and carrier layer may have been pre-shaped by a synthetic point spread function prior to projection. In one example, the receiver sensor 408 may capture the composite code mask in the infrared spectrum.

Still referring to FIG. 4, in some embodiments, the code layer may comprise n1 by n2 binary symbols, where n1 and n2 are integers greater than two. In the composite code mask, each symbol may be a line segment in one of two gray-scale shades distinct from the reference objects. The symbols of the code layer may be staggered in at least one dimension. The carrier layer reference objects may comprise a plurality of equally spaced reference stripes with a guard interval in between. The reference stripes and the guard interval may be of different widths. The width of each reference stripe relative to a guard interval width may be determined by an expected optical spreading of a transmitter device and/or a receiver device.

The processing circuit 404 may include a reference stripe detector circuit/module 412, a distortion adjustment circuit/module 414, a codeword identifier circuit/module 416, a depth detection circuit/module 418, and/or a depth map generation circuit/module 420.

The reference stripe detector circuit/module 412 may be configured to detect reference stripes within the portion of the composite code mask. The distortion adjustment circuit/module 414 may be configured to adjust a distortion of the portion of the composite code mask based on an expected orientation of the reference stripes relative to an actual orientation of the reference stripes. The codeword identifier circuit/module 416 may be configured to obtain a codeword from a window defined within the portion of the composite code mask. The depth detection circuit/module 418 may be configured to obtain depth information for a surface portion of the target object corresponding to the window based on: (a) a single projection of the composite code mask, and (b) a displacement of the window relative to a known reference code mask.

The depth map generation circuit/module 420 may be configured to assemble a depth map for the object based on a plurality of codewords detected as different overlapping windows within the portion of the undistorted composite code mask.

In one example, pre-shaping of at least one of the code layer and carrier layer increases power efficiency during the projection of the composite code mask, such that more power is perceived by a receiver sensor in comparison to an unshaped composite code mask.

In one instance, the synthetic point spread function used may be selected from a plurality of point spread functions based on at least one of: (a) expected channel conditions through which the composite code mask is to be projected, (b) characteristics of surfaces onto which the composite code mask is projected, and/or (c) a sensitivity of the receiver sensor which is to receive the projected composite code mask. In another example, the synthetic point spread function may be selected from a plurality of point spread functions based on at least one of: (a) a first channel response for a projector that is to project the composite code mask; and/or (b) a second channel response for a path from a projector, that is to project the composite code mask, to the receiver sensor, that is to receive the composite code mask.

Error Detection Device

Figure 5:
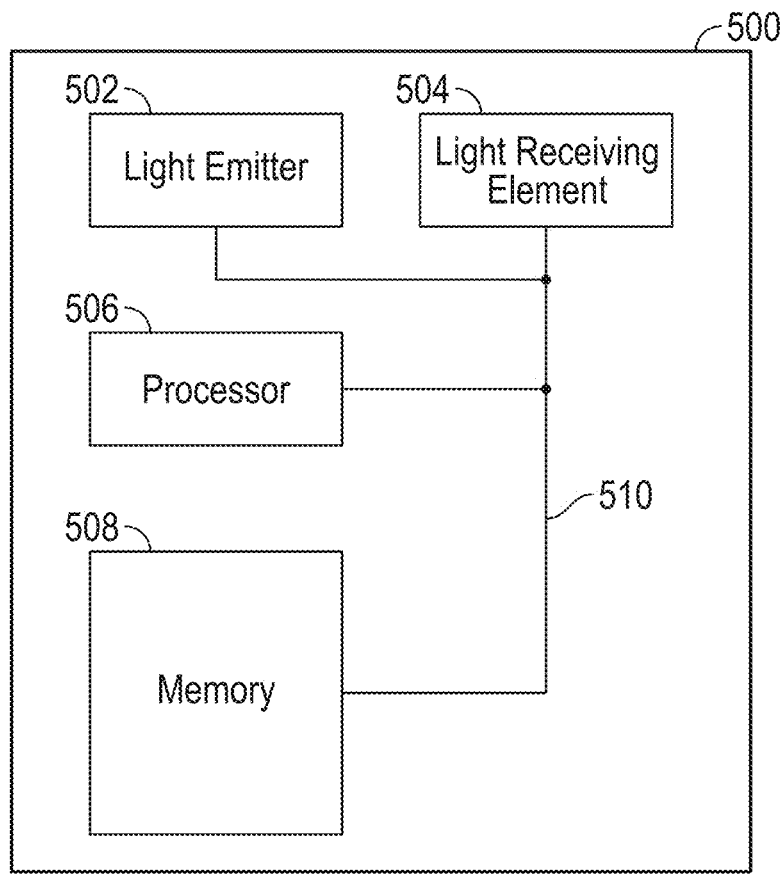
FIG. 5 illustrates a block diagram of one embodiment of an apparatus configured to perform one or more of the error correction methods disclosed herein.

FIG. 5 is a block diagram illustrating an embodiment of an apparatus configured to perform one or more of the error correction methods disclosed herein. An example depth mapping device 500 includes a light emitter 502, a light receiving element 504, a processor 506, and a memory 508. The light emitter 502, light receiving element 504, processor 506, and the memory 508 may be operably connected via a bus 510.

The memory 508 may store instructions that configure the processor 506 to perform one or more functions of the methods discussed herein. For example, instructions stored in the memory 508 may configure the processor 506 to control the light emitter 502 to emit light that encodes structured light as codewords, in order to illuminate a target object. Instructions stored in the memory 508 may further cause the processor 506 to control the light receiving element 504 to receive light reflecting from the target object and produce data encoded in the reflected light.

Figure 6:
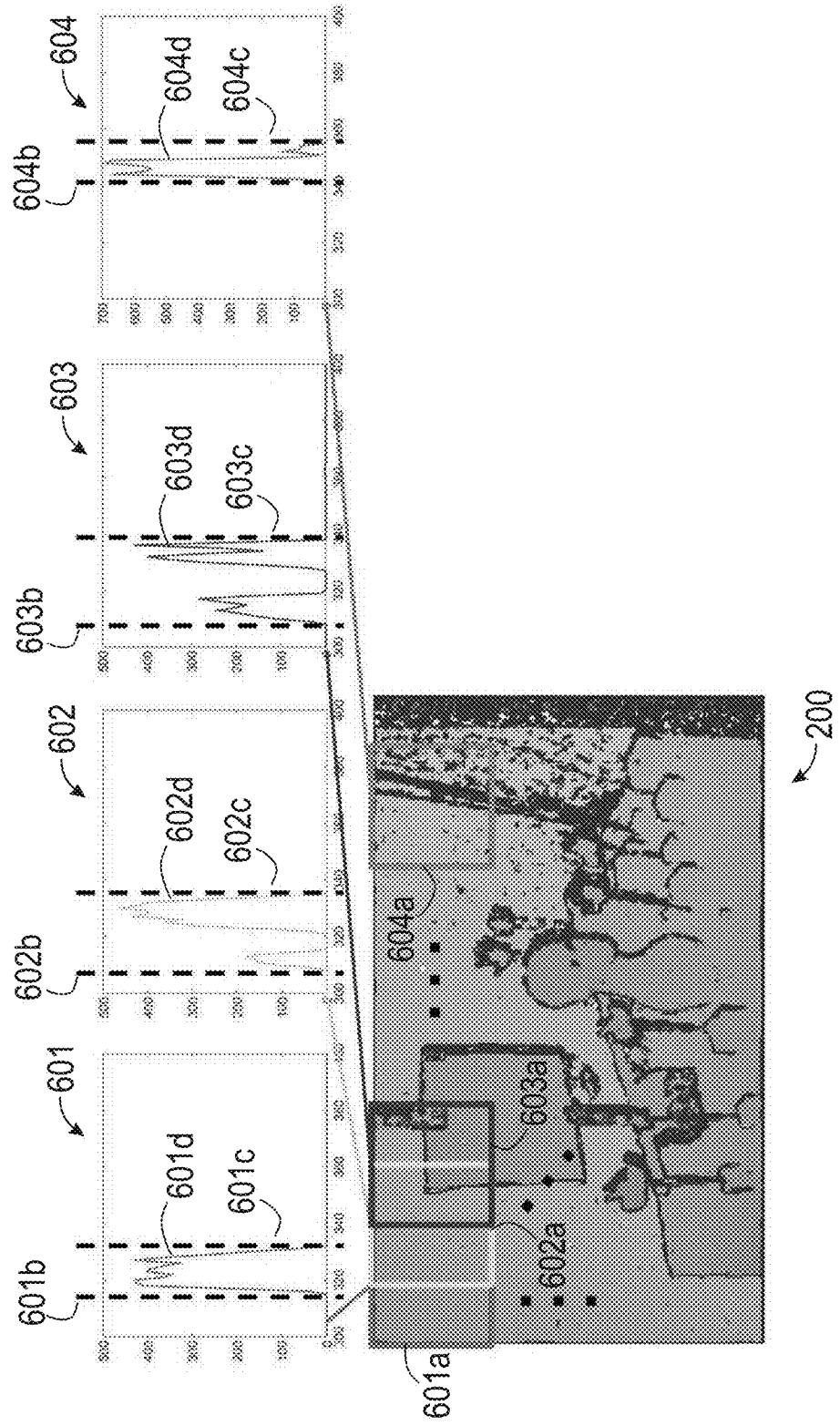
FIG. 6 illustrates the example depth map being portioned into segments, with a histogram being generated to determine a valid range of depth for each segment.

FIG. 6 illustrates how errors in a depth map may be detected. The example depth map 200 is shown prior to error correction. Codewords that include invalid values 201 can be seen as dark, shaded regions, for example, in the right-most edge of the depth map 200. Codewords that include accidentally valid values 202 can be seen as scatterings of off-color spots or regions in the depth map, often a distinctly different color or shade from the surrounding regions.

The error correction systems and methods described herein may detect an error when an invalid code or when an accidentally valid code is received. Correction of the error may be performed by determining a valid codeword based on any of the methods described below. In one example embodiment, the error correction system may divide the depth map 200 into a plurality of segments (e.g., 601a, 602a, 603a, and 604a). The plurality of segments may vary in size with respect to each segment, or the segments may take on size uniformity. The size of the segments may be user configurable or depend on the size of the projected image 104 and the codemask 410 therein. Other variables that may affect the size of each segment in the plurality of segments are the size of each unique codeword 120 in the codemask 410, the number of unique codewords 120 in the codemask 410, the resolution of the depth map 200, the size of the projected image 104, the size of the reflected image 110, etc. In one example, the depth map may be divided into a number of segments based on the size of the projected image 104, the segments being a plurality of coarse, overlapping regions. It is noted that this example should not be seen as limiting, as the number of segments may not have any overlapping features, and may be divided to be strictly adjacent, or a combination of overlapping and adjacent features.

Still referring to FIG. 6, the error correction system may determine a number of codewords in each segment, and categorize the number of codewords in intervals according to their corresponding depth value. The error correction system may further determine a range of intervals that represent a highest density of depth values for each segment. This can be accomplished using histogram quantiles, mean and variance, density distribution, or any other appropriate method of deducing two bounds. In one example, a processor 506 may analyze the codewords received by the light receiving element 504 of segment 601a and determine a range of depth values for that segment. For example, in calculating a density distribution of depth values for segment 601a, the processor 506 may determine a plurality of intervals—or range of values represented by the depth values in segment 601a—and then determine, of all the depth values included in segment 601a, how many depth values fall into each interval. This is illustrated in FIG. 6 as a histogram 601 developed for segment 601a. Histogram 601, representative of the density distribution of the depth values for segment 601a, includes an x-axis and a y-axis. The x-axis may be indicative of the plurality of intervals of depth values found in a particular segment, while the y-axis may be indicative of a number of depth values associated with each interval, or in other words, the density of distribution of depth values for that particular segment.

Referring to histogram 601, the greatest density of depth values 601d occur between interval values of approximately 315 and 335 on the x-axis. It should be noted that the values provided on the x-axis and y-axis are representative of an example scale and should not be seen as limiting. Similarly, histogram 602 shows the greatest density of depth values 602d occurring between interval values of approximately 310 and 335 on the x-axis. Histogram 603 shows the greatest density of depth values 603d occurring between interval values of approximately 310 and 340 on the x-axis, and histogram 604 shows the greatest density of depth values 604d occurring between interval values of approximately 340 and 355 on the x-axis. Hence, the histograms provide an example illustration of the data formulated by the processor 506 for each segment. Note that the depth values of a given segment remain unchanged when applying the statistical analysis of the given segment. However, in one example embodiment, the values in the segment may be weighted by a fixed or configurable weighting function. For example, for the purposes of providing a statistical analysis, the depth values may vary depending upon their location in a given segment, their location in the depth map 200, or according to a user configured weighing function.

Referring to segment 601a, once the processor 506 has organized the depth values of the segment 601a and determined the intervals of highest density, the processor may compute a minimum interval 601b and a maximum interval 601c. Still using segment 601a as an example, the minimum interval 601b may be determined to be a depth value of 315 and the maximum interval 601c may be determined to be a depth value of 335. Referring to segment 602a, once the processor 506 has organized the depth values of the segment 602a and determined the intervals of highest density, the processor may compute a minimum interval 602b and a maximum interval 602c. Still using segment 602a as an example, the minimum interval 602b may be determined to be a depth value of 310 and the maximum interval 602c may be determined to be a depth value of 335. Referring to segment 603a, once the processor 506 has organized the depth values of the segment 603a and determined the intervals of highest density, the processor may compute a minimum interval 603b and a maximum interval 603c. Still using segment 603a as an example, the minimum interval 603b may be determined to be a depth value of 310 and the maximum interval 603c may be determined to be a depth value of 340. Referring to segment 601a, once the processor 506 has organized the depth values of the segment 601a and determined the intervals of highest density, the processor may compute a minimum interval 601b and a maximum interval 601c. Still using segment 601a as an example, the minimum interval 601b may be determined to be a depth value of 340 and the maximum interval 601c may be determined to be a depth value of 355.

Using histogram 601 as an example, determining the minimum interval 601b and the maximum interval 601c may be a user configurable feature. For example, the user may implement a constraint that narrows the range of depth values 601d to a fixed or configurable quantile, placing the minimum interval 601b and the maximum interval 601c at values that include a percentage of the depth values in a given segment. For example, a fixed quantile may limit the minimum interval 601b and maximum intervals 601c to interval values that comprise 90% of more of the depth values of a given segment. In other words, the intervals comprising the outlier 10% of the remaining depth values will not be included in the depth range between the minimum interval 601b and the maximum interval 601c. In another example, the user may broaden the range of depth values in a similar way, or may manually enter limiting values for each segment. In this way, the user may enter one minimum interval 601b limit and one maximum interval 601c limit, or the user may enter a plurality of minimum interval limits and maximum interval limits for the segment 601a.

Still referring to example segment 601a, the processor 506 may limit the depth values of the segment 601a to the range of depth values 601d within the minimum interval 601b and maximum intervals 601c, by changing the depth values in areas of the segment 601a that fall outside of the range of depth values 601d to a depth value of a neighboring codeword if the neighboring codeword is within the range of values. For example, segment 601a may comprise depth values outside the range of depth values 601d determined by the processor 506. These values may include invalid values 201 or accidentally valid values 202. If a depth value in the segment 601a is determined to be outside the range of depth values 601d limited by the minimum interval 601b and maximum intervals 601c, the processor 506 may determine this value to be invalid. The processor 506 may look to the depth values neighboring the invalid value and determine whether the neighboring values are within the range of depth values 601d. If the neighboring depth values are determined to be within the range of depth values 601d, the processor 506 may determine an average of the neighboring depth values and assign that averaged value to the invalid depth value, replacing it. In another example, the depth values of the segment 601a that fall outside the range of depth values 601d may be manually changed to a specific value by the user.

Figure 7:
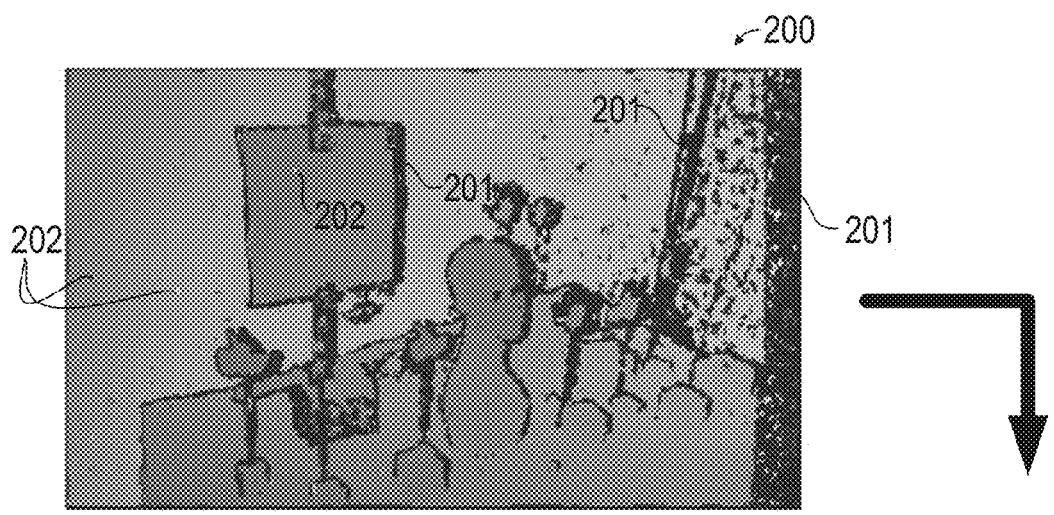
FIG. 7 illustrates the example depth map with a determination of a global minimum and a global maximum depth value, and the resulting depth map after outlier depth values have been corrected.
Figure 7:
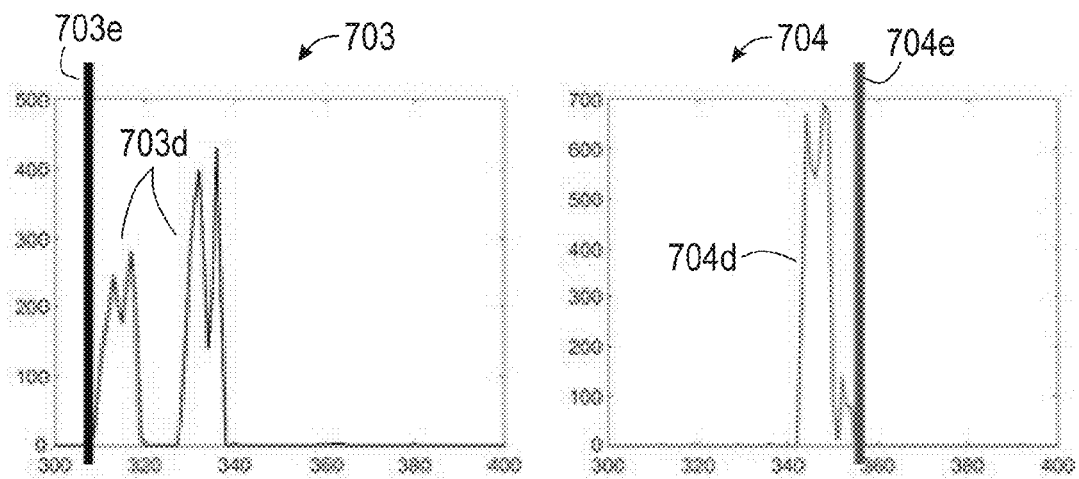
Figure 7:
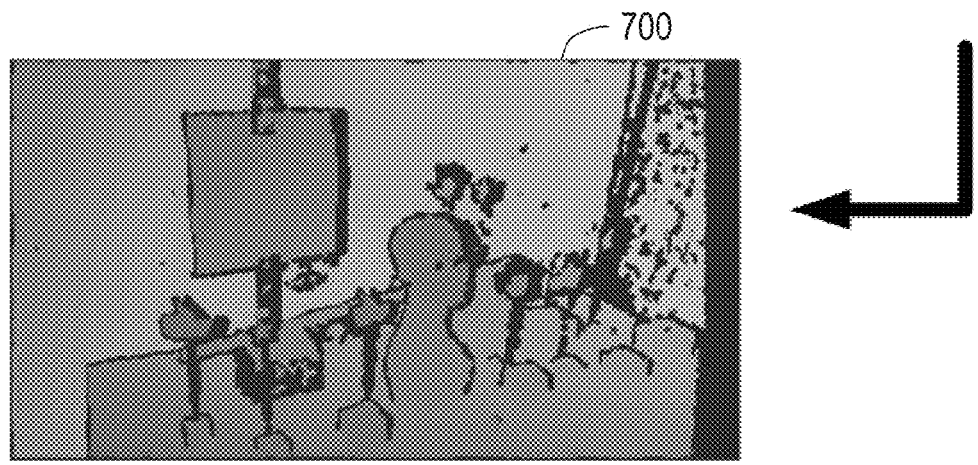

FIG. 7 illustrates a method of global error correction of the entire depth map 200 using the interval values determined for each of the segments in order to produce a corrected depth map 700. Note that in a preferred embodiment, the method of global error correction may be applied to the depth map 200 without correcting depth values on a segment level as discussed above. FIG. 7 includes an example depth map 200 before global error correction, as well as two example histograms (703 and 704) from two separate segments taken from the example depth map 200. The first histogram 703 represents a density distribution of the depth values for a given segment. In the example of first histogram 703, two regions of are shown to have the highest density of depth values 703*d*. The first region having the highest density of depth values from approximately 310 to 320, the second region having the highest density of depth values from approximately 325 to 340. In this example, the segment associated with first histogram 703 is determined to include the lowest depth value interval 703*e* of all the other segments of the depth map 200.

The second histogram 704 represents a density distribution of the depth values for a given segment. In the example of second histogram 704, two regions of are shown to have the highest density of depth values 704*d*. The first region having the highest density of depth values from approximately 340 to 350, the second region having the highest density of depth values from approximately 350 to 355. In this example, the segment associated with second histogram 704 is determined to include the highest depth value interval 704*e* of all the other segments of the depth map 200.

Global error correction using the interval values (703*e* and 704*e*) may be used to correct outlier depth values in the depth map 200. In one example, processor 506 may divide the depth map 200 into a plurality of segments and determine a minimum and maximum interval and a range of depth values for each segment, as described above. The processor 506 may then compare the minimum and maximum intervals of all the segments and determine the lowest depth value interval 703*e* found in the plurality of segments and the highest depth value interval 704*e* found in the plurality of segments. The processor may then use the range of depth values falling between the lowest depth value interval 703*e* and the highest depth value interval 704*e* as a valid depth range to locate invalid depth values in the depth map 200 that fall outside of this range.

The invalid and outlier depth values in the depth map 200 may be corrected using any one of a variety of techniques. The processor 506 may change an invalid depth value to a neighboring depth value that is valid. The processor 506 may determine the validity of the depth values surrounding the invalid depth value. Upon determination of the validity of the surrounding depth values, the processor may correct the invalid depth value by replacing it with a new value based on interpolation of the valid neighboring depth values. Methods of interpolation may include, averaging the surrounding depth values, using pattern recognition software to determine a pattern and correcting the invalid depth value to maintain the pattern, or any other method of interpolation. For example, in some embodiments, for each outlier depth value to be corrected, N (e.g., ten) closest valid depth values within the segment or the entire depth map 200 may be determined, and the weighted (e.g., by distance) average of the N depth values may be computed as the new depth value for the respective outlier. For example, if (d0, . . . , d9) are the values of the ten closest valid depth values to outlier depth value P, and (D0, . . . , D9) are the distances from these depth values to outlier depth value P (in ascending order by distance), and:

$$\Delta = \sum_{i=0}^{9} D_i$$

then the weighted average (w) is:

$$w = \sum_{i=0}^{9} d_i \frac{D_{9-i}}{\Delta}$$

The weighted average may be used to replace the outlier depth value P. In one embodiment, to replace an outlier depth value, the eight closest neighbors (d0 . . . d7) may be used. For example, the eight closest neighboring depth values may include two horizontal neighbors, two vertical neighbors, and the four corner neighbors. N may be a dynamic number depending on the location of the depth value in the depth map. For example, a depth value in the corner of a depth map will have a smaller N value than a depth value in the middle of the depth map. In another example, the N value may remain the same for an outlier depth value in the corner of the depth map, in which case the neighboring depth values may include depth values that are not immediately adjacent to the outlier depth value. N may also be a user configurable number, and may be configured to include more or less depth values than the eight depth values closest to the outlier depth value.

As another example, in some embodiments, a gradient fill may be used for correcting outlier depth values. For example, the processor 506 may take into account an area of valid depth values surrounding the outlier depth value, and may assign a directional value to the valid depth values indicating a trend of rising or falling depth values. Based on this trend, the processor 506 may be configured to estimate a depth value to replace the outlier depth value. In some embodiments, a low frequency depth/disparity fill in technique may be used. For example, a technique may be used that fits a plane d(u,v)=au+bv+c using valid data, where (u,v) are coordinates of a depth value. This corrects an outlier depth value (u*,v*) by setting its replacement depth value to au*+bv*+c. Note that other shapes than a plane may be used as a model for replacing pixels in some embodiments. Other methods for correcting the pixels may be used in other embodiments.

Figure 8:
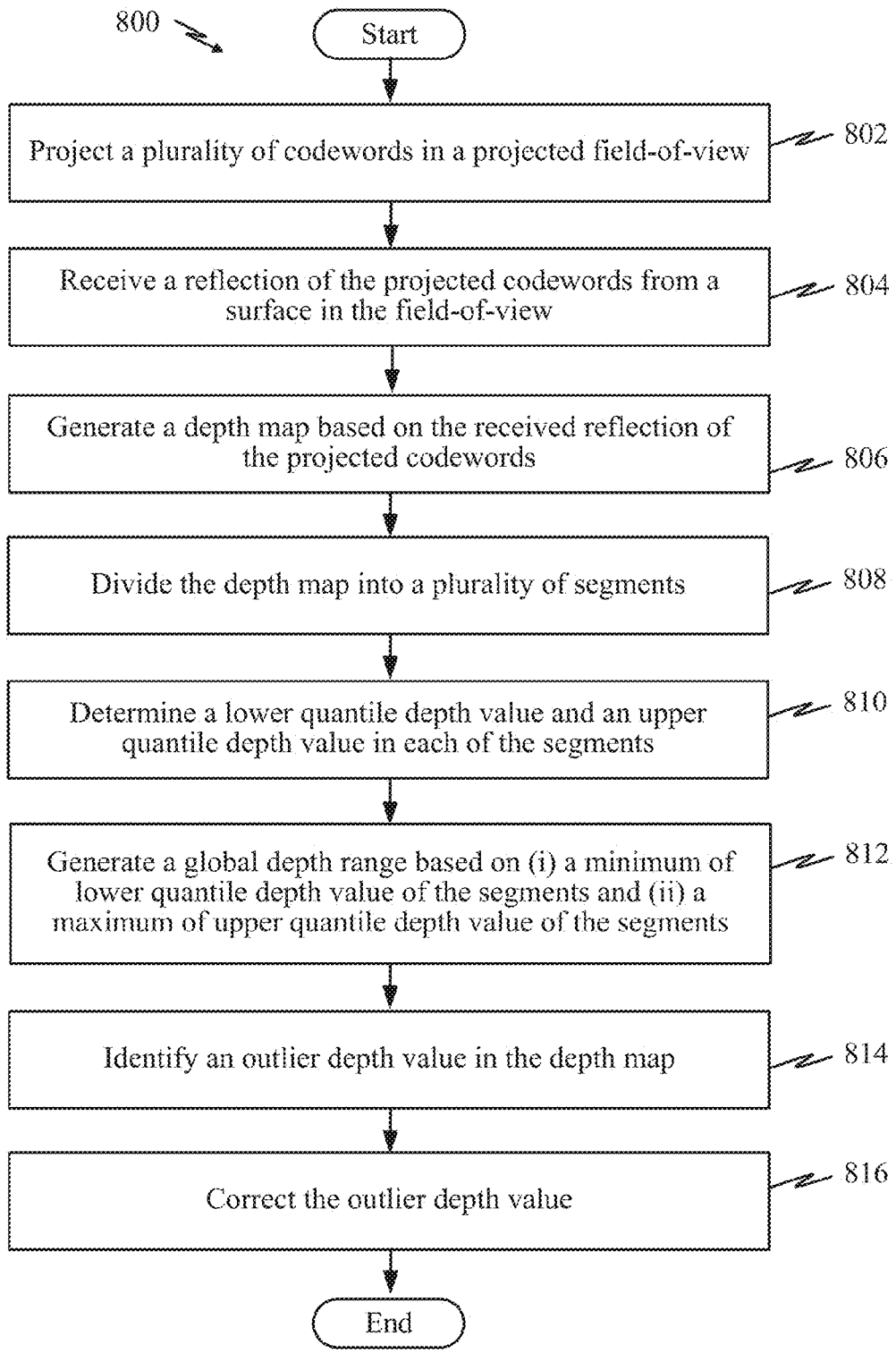
FIG. 8 is a flowchart that illustrates an example of a method for identifying and correcting outlier depth values in a depth map.

FIG. 8 is a flowchart that illustrates an example of a process 800 of detecting and correcting outlier depth values in a depth map 107. At block 802, the process 800 projects a plurality of codewords in a projected field-of-view from a transmitter. In some implementations, the functionality of block 802 may be performed by the transmitter 102 illustrated in FIG. 1 or the transmitter device 302 in FIG. 3. At block 804, the process 800 receives a reflection of the projected codewords from a surface in the field-of-view. In some implementations, the functionality of block 804 may be performed by the receiver 108 illustrated in FIG. 1 or the receiver device 402 illustrated in FIG. 4. At block 806, the process 800 generates a depth map based on the received reflection of the projected codewords. In some implementations, the functionality of block 806 may be performed by the processing circuit 404 illustrated in FIG. 4 or the depth mapping device 500 of FIG. 5. At block 808, the process 800 divides the depth map into a plurality of segments. In some implementations, the functionality of block 808 may be performed by the processing circuit 404 illustrated in FIG.

4 or the depth mapping device 500 of FIG. 5. At block 810, the process 800 determines a lower quantile depth value and an upper quantile depth value in each of the segments. In some implementations, the functionality of block 810 may be performed by the processing circuit 404 illustrated in FIG. 4 or the depth mapping device 500 of FIG. 5. At block 812, the process 800 generates a global depth range based on (i) a minimum of the lower quantile depth value of the segments and (ii) a maximum of the upper quantile depth value of the segments. In some implementations, the functionality of block 812 may be performed by the processing circuit 404 illustrated in FIG. 4 or the depth mapping device 500 of FIG. 5. At block 814, the process 800 identifies an outlier depth value in the depth map. In some implementations, the functionality of block 814 may be performed by the processing circuit 404 illustrated in FIG. 4 or the depth mapping device 500 of FIG. 5. At block 816, the process 800 corrects the outlier depth value. In some implementations, the functionality of block 816 may be performed by the processing circuit 404 illustrated in FIG. 4 or the depth mapping device 500 of FIG. 5.

Figure 9:
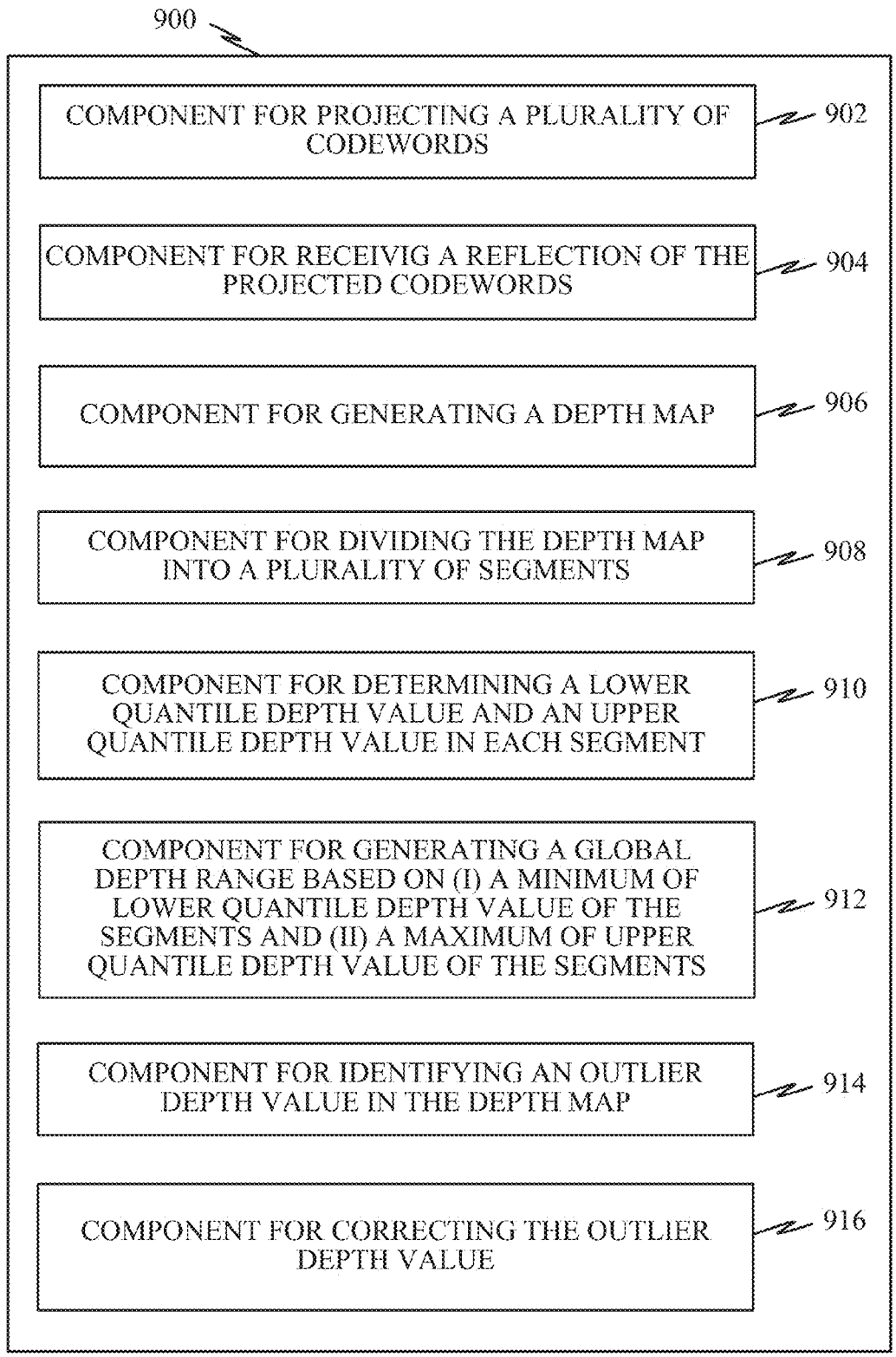
FIG. 9 is a block diagram illustrating an example of an apparatus for identifying and correcting at least one outlier depth value in a depth map.

FIG. 9 is a block diagram illustrating an example of an apparatus 900 for detecting and correcting outlier depth values in a depth map 107. The apparatus 900 may include a component for projecting 902 a plurality of codewords in a projected field-of-view. In some implementations, the component for projecting 902 may be performed by the transmitter 102 illustrated in FIG. 1 or the transmitter device 302 in FIG. 3. The apparatus 900 may include a component for receiving 904 a reflection of the projected codewords from a surface in the projected field-of-view. In some implementations, the component for receiving 904 may be the receiver 108 illustrated in FIG. 1 or the receiver device 402 illustrated in FIG. 4. The apparatus 900 may include a component for generating 906 a depth map based on the received reflection of the projected codewords. In some implementations, the component for generating 906 may be performed by the processing circuit 404 illustrated in FIG. 4 or the depth mapping device 500 of FIG. 5. The apparatus 900 may include a component for dividing 908 a depth map into a plurality of segments. In some implementations, the component for dividing 908 may be performed by the processing circuit 404 illustrated in FIG. 4 or the depth mapping device 500 of FIG. 5. The apparatus 900 may include a component for determining 910 a lower quantile depth value and an upper quantile depth value in each of the segments. In some implementations, the component for determining 910 may be performed by the processing circuit 404 illustrated in FIG. 4 or the depth mapping device 500 of FIG. 5. The apparatus 900 may include a component for generating 912 a global depth range based on (i) a minimum of lower quantile depth values of the segments and (ii) a maximum of upper quantile depth values of the segments. In some implementations, the component for generating 912 may be performed by the processing circuit 404 illustrated in FIG. 4 or the depth mapping device 500 of FIG. 5. The apparatus 900 may include a component for identifying 914 an outlier depth value in the depth map. In some implementations, the component for identifying 914 may be performed by the processing circuit 404 illustrated in FIG. 4 or the depth mapping device 500 of FIG. 5. The apparatus 900 may include a component for correcting 916 an outlier depth value based on information in the depth map. In some implementations, the component for correcting 916 may be performed by the processing circuit 404 illustrated in FIG. 4 or the depth mapping device 500 of FIG. 5.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described in the figures. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium," "computer-readable medium," and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

A person having ordinary skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. An apparatus, comprising:
   a transmitter configured to project a plurality of codewords in a field-of-view;
   a receiver configured to receive a reflection of each of the projected codewords from a surface in the field-of-view; and
   a processor configured to:
   generate a depth map based on the received reflections, each reflection having a corresponding depth value;
   determine a plurality of segments of the depth map, each segment comprising a number of the reflections;
   determine a lower quantile depth value and an upper quantile depth value in each segment; and
   generate a global depth range for the depth map based on the lower quantile depth value and the upper quantile depth value in each segment.

2. The apparatus of claim 1, wherein the upper quantile depth value and the lower quantile depth value are determined based on at least one of (i) a histogram quantile calculation and (ii) a mean and variance calculation, each of the calculations based on a range of depth values in each segment and a contiguous subset of the range of depth values, the contiguous subset representing a density of depth values in the segment.

3. The apparatus of claim 2, wherein the contiguous subset of the range depth values comprises the lower quantile depth value and the upper quantile depth value, the lower quantile depth value being the lowest depth value within the contiguous subset and the upper quantile being the highest depth value in the contiguous subset.

4. The apparatus of claim 1, wherein the transmitter projects the plurality of codewords via propagating light through a codemask, the codemask having a plurality of symbols.

5. The apparatus of claim 1, wherein the processors determines whether a given depth value that falls outside of the global depth range exists in the depth map via detecting a depth value in the depth map outside of the global depth range.

6. The apparatus of claim 1, wherein the plurality of segments comprise overlapping regions of the depth map.

7. The apparatus of claim 1, wherein a size of each segment in the plurality of segments is user configurable.

8. The apparatus of claim 1, wherein the processor is further configured to determine whether a given depth value that falls outside of the global depth range exists in the depth map.

9. The apparatus of claim 8, wherein the processor is further configured to:
   identify an outlier depth value in the depth map; and
   correct the outlier depth value based on information in the depth map.

10. The apparatus of claim 9, wherein the processor corrects the outlier depth value via:
    determining a plurality of depth values neighboring the outlier depth value, the plurality of depth values being within the global depth range;
    calculating a first depth value based on the plurality of depth values; and
    replacing the outlier depth value with the first depth value.

11. The apparatus of claim 10, wherein the first depth value is an average of the plurality of depth values.

12. The apparatus of claim 1, wherein the processor corrects the outlier depth value via:
    determining a plurality of depth values neighboring the outlier depth value, the plurality of depth values being within the global depth range;
    calculating at least one of a horizontal gradient and a vertical gradient of the neighboring depth values;
    calculating a first depth value based on the at least one of the horizontal gradient and the vertical gradient; and
    replacing the outlier depth value with the first depth value.

13. The apparatus of claim 1, wherein the global depth range has a minimum based on the lowest quantile depth value of the segments and a maximum based on the upper quantile depth value of the segments.

14. An method, comprising:
    projecting, via a transmitter, a plurality of codewords in a field-of-view;
    receiving, at a receiver, a reflection of each of the projected codewords from a surface in the field-of-view;
    generating, via a processor, a depth map based on the received reflections, each reflection having a corresponding depth value;

determining, via the processor, a plurality of segments of the depth map, each segment comprising a number of the reflections;

determining, via the processor, a lower quantile depth value and an upper quantile depth value in each segments; and generating, via the processor, a global depth range for the depth map based on the lower quantile depth value and the upper quantile depth value in each segment.

15. The method of claim 14, wherein the upper quantile depth value and the lower quantile depth value are determined based on at least one of (i) a histogram quantile calculation and (ii) a mean and variance calculation, each of the calculations based on a range of depth values in each segment and a contiguous subset of the range of depth values, the contiguous subset representing a density of depth values in the segment.

16. The method of claim 15, wherein the contiguous subset of the range depth values comprises the lower quantile depth value and the upper quantile depth value, the lower quantile depth value being the lowest depth value within the contiguous subset and the upper quantile being the highest depth value in the contiguous subset.

17. The method of claim 14, wherein projecting the plurality of codewords comprises propagating light through a codemask, the codemask having a plurality of symbols.

18. The method of claim 14, wherein the plurality of segments comprise overlapping regions of the depth map.

19. The method of claim 14, wherein a size of each segment in the plurality of segments is user configurable.

20. The method of claim 11, further comprising, via the processor, determining whether a given depth value that falls outside of the global depth range exists in the depth map.

21. The method of claim 20, wherein determining whether a given depth value that falls outside of the global depth range exists in the depth map comprises detecting a depth value in the depth map outside of the global depth range.

22. The method of claim 20, further comprising, via the processor, identifying an outlier depth value in the depth map; and correcting outlier depth value based on information in the depth map.

23. The method of claim 22, wherein correcting the outlier depth value comprises:
  determining a plurality of depth values neighboring the outlier depth value, the plurality of depth values being within the global depth range;
  calculating a first depth value based on the plurality of depth values; and
  replacing the outlier depth value with the first depth value.

24. The method of claim 23, wherein the first depth value is an average of the plurality of depth values.

25. The method of claim 22, wherein correcting the outlier depth value comprises:
  determining a plurality of depth values neighboring the outlier depth value, the plurality of depth values being within the global depth range;
  calculating at least one of a horizontal gradient and a vertical gradient of the neighboring depth values;
  calculating a first depth value based on the at least one of the horizontal gradient and the vertical gradient; and
  replacing the outlier depth value with the first depth value.

26. The method of claim 14, wherein the global depth range has a minimum based on the lowest quantile depth value of the segments and a maximum based on the upper quantile depth value of the segments.

27. An apparatus, comprising:
  means for projecting a plurality of codewords in a field-of-view;
  means for receiving a reflection of each of the projected codewords from a surface in the field-of-view;
  means for generating a depth map based on the received reflection, each reflection having a corresponding depth value;
  means for determining a plurality of segments of the depth map, each segment comprising a number of the reflections;
  means for determining a lower quantile depth value and an upper quantile depth value in each segment; and
  means for generating a global depth range for the depth map based on the lower quantile depth value and the upper quantile depth value in each segment.

28. The apparatus of claim 27, wherein the upper quantile depth value and the lower quantile depth value are determined based on at least one of (i) a histogram quantile calculation and (ii) a mean and variance calculation, each of the calculations based on a range of depth values in each segment and a contiguous subset of the range of depth values, the contiguous subset representing a density of depth values in the segment.

29. The apparatus of claim 28, wherein the contiguous subset of the range depth values comprises the lower quantile depth value and the upper quantile depth value, the lower quantile depth value being the lowest depth value within the contiguous subset and the upper quantile being the highest depth value in the contiguous subset.

30. The apparatus of claim 27, wherein the means for projecting the plurality of codewords comprises means for propagating light through a codemask, the codemask having a plurality of symbols.

31. The apparatus of claim 27, further comprising means for determining whether a given depth value that falls outside of the global depth range exists in the depth map.

32. The apparatus of claim 31, wherein the means for determining whether a given depth value that falls outside of the global depth range exists in the depth map comprises means for detecting a depth value in the depth map outside of the global depth range.

33. The apparatus of claim 31, further comprising means for identifying an outlier depth value in the depth map; and means for correcting the outlier depth value based on information in the depth map.

34. The apparatus of claim 33, wherein the means for correcting the outlier depth value comprises:
  means for determining a plurality of depth values neighboring the outlier depth value, the plurality of depth values being within the global depth range;
  means for calculating a first depth value based on the plurality of depth values; and
  means for replacing the outlier depth value with the first depth value.

35. The apparatus of claim 33, wherein the means for correcting the outlier depth value comprises:
  means for determining a plurality of depth values neighboring the outlier depth value, the plurality of depth values being within the global depth range;
  means for calculating at least one of a horizontal gradient and a vertical gradient of the neighboring depth values;
  means for calculating a first depth value based on the at least one of the horizontal gradient and the vertical gradient; and
  means for replacing the outlier depth value with the first depth value.

36. The apparatus of claim 27, wherein the global depth range has a minimum based on the lowest quantile depth value of the segments and a maximum based on the upper quantile depth value of the segments.

37. A non-transitory computer-readable medium comprising instructions that when executed by a device cause the device to:
   project, via a transmitter, a plurality of codewords in a field-of-view;
   receive, at a receiver, a reflection of each of the projected codewords from a surface in the field-of-view;
   generate, via an error correction system, a depth map based on the received reflections, each reflection having a corresponding depth value;
   determine, via the error correction system, a plurality of segments of the depth map, each segment comprising a number of the reflections;
   determine, via the error correction system, a lower quantile depth value and an upper quantile depth value in each segments; and
   generate, via the error correction system, a global depth range for the depth map based on the lower quantile depth value and the upper quantile depth value in each segment.

38. The non-transitory computer readable medium of claim 37, wherein the upper quantile depth value and the lower quantile depth value are determined based on at least one of (i) a histogram quantile calculation and (ii) a mean and variance calculation, each of the calculations based on a range of depth values in each segment and a contiguous subset of the range of depth values, the contiguous subset representing a density of depth values in the segment.

39. The non-transitory computer readable medium of claim 38, wherein the contiguous subset of the range depth values comprises the lower quantile depth value and the upper quantile depth value, the lower quantile depth value being the lowest depth value within the contiguous subset and the upper quantile being the highest depth value in the contiguous subset.

* * * * *